Figure 1:
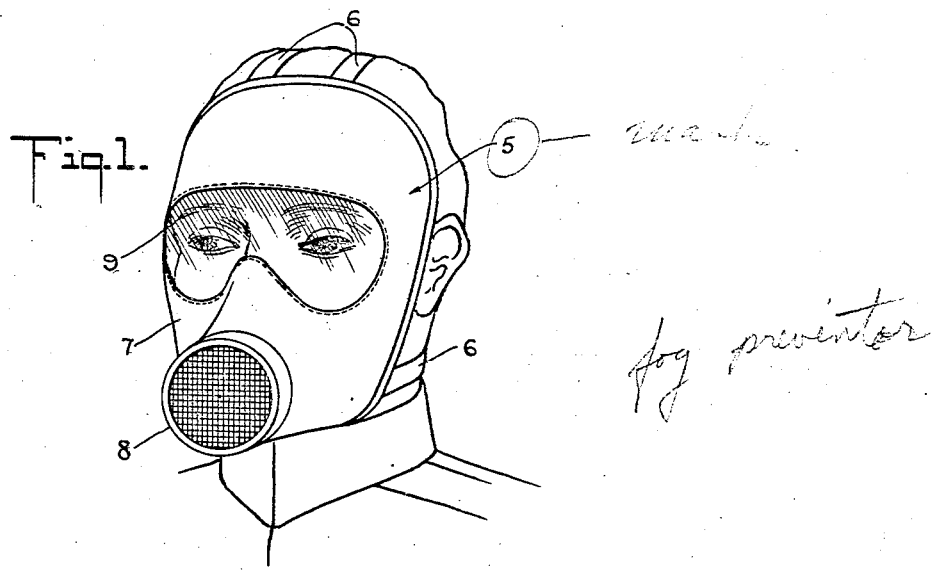

April 21, 1942.    B. ANDERSEN    2,280,055

TRANSPARENT PLASTIC MATERIALS

Filed Jan. 28, 1939

INVENTOR
BJORN ANDERSON

Patented Apr. 21, 1942

2,280,055

UNITED STATES PATENT OFFICE 2,280,055

TRANSPARENT PLASTIC MATERIALS

Bjorn Andersen, Maplewood, N. J., assignor, by mesne assignments, to Celanese Corporation of America, a corporation of Delaware Application January 28, 1939, Serial No. 253,251

6 Claims. (Cl. 2—14)

This invention relates to the production of transparent plastic materials of improved properties, and relates more particularly to the production of a non-fogging type of transparent plastic material.

An object of this invention is to provide a transparent plastic material which is not susceptible to fogging or sweating when exposed to moisture-laden atmosphere or at low temperatures conducive to moisture condensation.

Another object of this invention is the provision of a transparent plastic material suitable for use as lenses in goggles and eye glasses, as windshields in automobiles, airplanes, military tanks, and as transparent containers for moisture containing substances, etc. A further object of this invention is to provide a transparent plastic material having a moisture-absorptive surface which prevents fogging and which is impervious to moisture, gases and the like.

A specific object of this invention is the provision of an improved transparent plastic material which is suitable for use as lenses or eyepieces in gas masks.

Other objects of this invention will appear from the following detailed description.

Although as indicated above the transparent plastic material of the present invention may satisfactorily be used in all places where fogging or sweating of glass or glass substitutes is objectionable, the present invention will be described in connection with its use in gas masks where the provision of a fog-proof or sweat-proof eyepiece is of the utmost importance.

To overcome in some measure the fogging or sweating that takes place on glass, ordinarily used in gas masks, attempts have hitherto been made to utilize a thin sheet of gelatin or other moisture absorptive transparent medium on the inside surface of the glass lens or lenses, i. e., between the glass lens or lenses and the eyes. These gelatin inserts or linings, which may be attached by suitable beading so as to seal the glass and prevent same from coming in contact with any exhaled breath, possess a number of disadvantages. For example, under certain atmospheric conditions, the gelatin swells, becoming sticky, wrinkled and putrescent thereby necessitating frequent replacements. Such replacements may be made in goggles and the like but, as will readily be appreciated, it may be extremely hazardous to make a replacement of the gelatin inserts in a gas mask when worn in a gas-laden atmosphere, for example. If these replacements of the inserts are not made when necessary, i. e., when the inserts are swollen, tacky, wrinkled or buckled, the vision is distorted making the gas mask useless for its designed purposes. Furthermore, the gelatin inserts when stored in extremely dry warm places tend to shrink and crack so that they do not fit properly when attached to the lenses nor do they afford the clear vision which is required.

The inherent disadvantages of the gelatin inserts have led investigators to try other expedients to prevent the fogging or sweating of glass lenses. For instance, attempts have been made to use on the lenses of the gas masks chemical compositions found on the market for spraying on to glass windshields to prevent frosting, water condensation or sweat, etc. These chemical compositions were not satisfactory for use on the lenses of a gas mask since it was not always convenient to take off the gas mask and apply these compositions. For example, a gas mask could not with safety be taken off in a poisonous gas-laden atmosphere for the purpose of applying to the lenses a fog-preventing composition. Furthermore, some of these chemical compositions are irritating to the eyes when applied to lenses confined within a closed space such as in a gas mask or tight fitting goggles. Other objections are their water-solubility resulting in the eventual removal and disappearance of the protective film.

Attempts were made to substitute transparent plastic materials made from cellulose derivatives such as cellulose acetate or from certain synthetic resins such as polymerized vinyl compounds, polymerized acrylic acid and methacrylic acid esters, urea formaldehyde, etc., for the glass or the gelatin coated glass. It was found that these transparent plastic materials also failed to resist fogging or sweating. This lack of resistance of the transparent plastic material to fogging or sweating was due to the fact that such plastic materials were all made more or less water-insoluble to minimize moisture absorption. These plastic materials could, of course, be made more porous and sponge-like and thus absorb moisture but there is always the danger that the material being porous would impair vision and permit gases to seep therethrough, prohibiting their use as lenses in gas masks.

In accordance with my invention I produce a transparent plastic material having non-fogging and non-sweating characteristics, which transparent plastic material retains its non-porous character, by treating one or both surfaces only of a derivative of cellulose sheet leaving the inner portion or core thereof in a substantially unaffected condition. Such a sheet is substantially impervious to both moisture and gas and has a layer, on one or both surfaces thereof, which is water-absorptive.

Figure 2:
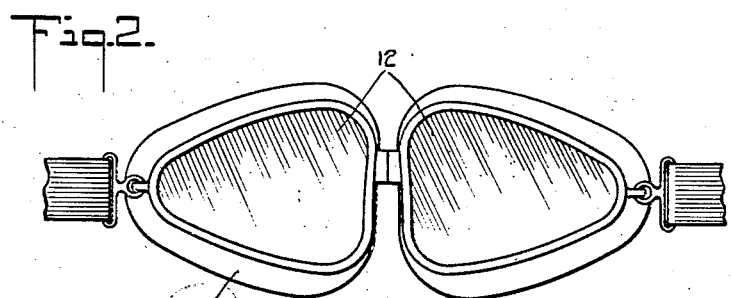
Figure 3:
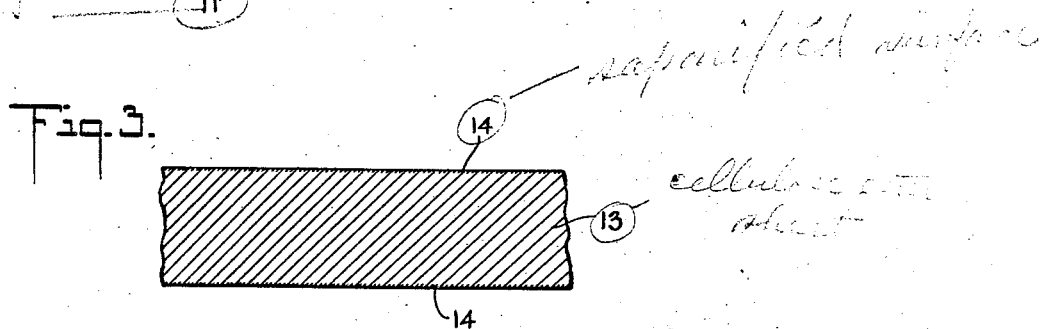

In the accompanying drawing wherein the preferred embodiments of my invention are shown, Figure 1 is a front view of a mask employing a lens made from the sheet material of my invention, Figure 2 is a front view of a pair of goggles the lenses of which are made from my improved sheet material, and Figure 3 is a showing on an enlarged scale of a cross-section of the material of my invention.

Referring to Figure 1 of the drawing, the mask in which my invention is embodied is generally indicated by reference numeral 5 and is shown held in position on the head of the wearer by means of straps 6. The mask comprises a facepiece 7, made of rubber or other suitable flexible and gas-impervious material, and has mounted in the lower portion thereof an air-purifying canister 8, the upper portion thereof being provided with an eyepiece or lens 9. Although a single large eyepiece is shown, it will be understood that two eyepieces, one for each eye, may be used if desired. The goggles 11 shown in Figure 2 have set therein in any suitable manner eyepieces 12 made of the non-fogging and non-sweating sheet material of my invention. These eyepieces may also represent inserts or linings of the non-fogging plastic sheeting used in conjunction with the glass lenses as already described in the case of gelatin inserts.

In accordance with this invention I produce sheet material, which is not susceptible to fogging or sweating when exposed to moisture laden atmosphere, for use wherever such non-fogging or non-sweating material is desirable, by superficial saponification, hydrolyzing or de-esterification of sheet material comprising esters of cellulose such as cellulose nitrate, cellulose formate, cellulose propionate, cellulose aceto propionate, cellulose butyrate, cellulose aceto butyrate and particularly cellulose acetate. Such superficial saponification is indicated in Figure 3 where there is shown a sheet 13 saponified superficially at the surfaces 14. In accordance with this invention either one or both of the surfaces may be saponified. In order to obtain sheets which are perfectly flat and free from distortion, "knife lines," etc. it is preferable to heat press and polish the sheets before and after treatment with the saponifying agent.

Superficial saponification of the cellulose ester sheet material may be effected in any convenient manner such as by treatment in an alkaline bath or by padding or otherwise mechanically impregnating the sheet material with the requisite quantity of saponifying agent.

The alkaline bath used for superficially saponifying the cellulose ester sheet material may be either of low concentration or high concentration depending on the temperature and duration of treatment. If an alkaline solution of low concentration is used higher temperatures may be employed in the process, whereas if alkaline solutions of high concentrations are employed low temperatures of treatment are used. If a solution of intermediate concentration is employed, intermediate temperatures of treatment should be used. The saponifying bath may contain any suitable alkali or alkaline salt for producing hydroxyl ions in aqueous solution. The alkalies which may be used are sodium hydroxide, potassium hydroxide or ammonia. Examples of alkaline salts are sodium or potassium carbonates, sodium, potassium, or ammonium sulphide or hydrosulphide, sodium or potassium silicate and tri-sodium phosphate. In order to promote intense surface saponification of the cellulose ester sheet material salts or modifying agents such as soap, sodium acetate, sodium oleate, thiocyanates, borax, alcohol, glycol and polyglycol or their derivatives such as methyl glycol, etc., may be added to the saponifying bath.

The sheet materials used in accordance with this invention may contain, besides the cellulose ester, effect materials for modifying the properties of said sheet materials, such as plasticizers, fillers, dyes or lakes, fire retardants, etc. For instance, the sheet material may contain about 5 to 30 or more parts of plasticizer which may be any suitable one for the particular cellulose ester employed. The plasticizers may be any of the high boiling solvents or softening agents as, for example, the aryl sulphonamides such as para ethyl toluol sulphonamide, the alkyl phthalates such as dimethyl phthalate, the dialkyl tartrates such as dibutyl tartrate, the alkoxy esters of polybasic organic acids such as dimethoxy ethyl phthalate, the polybasic acid esters of the mono alkyl ethers of polyhydric alcohols such as diethylene glycol ethyl ether ester of phthalic acid, the alkyl esters of phosphoric acid such as triethyl glycol phosphate, the aryl esters of phosphoric acid such as triphenyl phosphate, tricresyl phosphate, the mixed alkyl and aryl phosphates, and camphor. A mixture of any of the foregoing plasticizers may be employed if desired. The fire retardants which may be employed in the cellulose ester sheet material may be tricresyl phosphate, triphenyl phosphate, chlorinated naphthalenes, chlorinated diphenyls, compounds containing bromine and other like fire retardants known to be compatible with the cellulose ester employed. The fire retardants may be added to the sheet material in a quantity of about 15 or more parts by weight. If desired water soluble plasticizers and/or fire retardants may be used to some extent as, for example, to secure a greater depth of porosity.

While any of the foregoing saponifying agents may be used in making the sheet material of my invention, I prefer to use an aqueous solution of ammonia. In the preferred process of treating the cellulose acetate sheet material the sheets which may vary in thickness from about 0.001 to 0.100 of an inch or more are first cleaned and then polished in the usual manner between heated polishing plates. These sheets are then immersed for a period of from 2 to 6 hours, depending on the thickness, in a saponifying bath containing ammonia in a concentration of about 15 to 20%, at a temperature between 60 to 75° F., preferably 65° F. If the temperature exceeds 75° F. an undesirable distortion of the sheet material may take place. After the sheets are taken from the bath they are washed in running water at a temperature of 60 to 75° F., preferably 65° F., for from 20 to 300 hours depending upon the thickness of the sheet being treated. In order to prevent discoloration of the sheet material it is preferable to exclude air from the sheets until all of the ammonia and degraded products have been removed by washing or scrubbing. The surfaces of the sheets are then dried thoroughly by wiping with chamois and by storing the sheets at room temperature between tissue lined "falulah" boards for a period of 3 to 4 hours to 3 days depending on the thickness of the sheet employed. For example, sheets of a thickness of 0.005 to 0.010 of an inch are dried at room temperature for 3 to 4 hours, whereas sheets having a thickness of 0.060 of an inch are preferably dried for 24 hours at room temperature between the boards, then are transferred to dry pads and further dried for 24 hours at 120° F. and then 24 hours at 140° F. When the sheets are thoroughly dried they are flattened between polishing plates in a pre-heated press for about 20 minutes at 50 to 150, preferably 125, pounds of steam under from 500 to 1500, preferably 1250, pounds of hydraulic pressure per square inch. This removes any surface irregularities, distortions, knife lines, etc. The polished sheets are then ready for use.

As will appear from the following tables, the cellulose ester sheets treated in accordance with this invention have physical characteristics which are quite different from those of the untreated sheet.

The chemical formula of the sheets tested is cellulose acetate 100 parts by weight and dimethoxy ethyl phthalate (plasticizer) 30 parts by weight. This composition is, however, only illustrative.

(A) *Untreated sheet*

| | | | |
|---|---|---|---|
| Thickness thousandths of inch | 5 | 10 | 20 |
| Fog resistance seconds | 2 | 2 | 2 |
| Tensile strength, in pounds per sq. in.: | | | |
| A. Yield point | 6,160 | 4,825 | 5,260 |
| B. Break point | 7,730 | 6,150 | 5,860 |
| Elongation percent | 38.7 | 35.5 | 32.1 |
| Hardness | 6.66 | 6.34 | 6.74 |
| Moisture absorption | 3.94 | 4.05 | 4.50 |
| Water shrinkage percent | .957 | .717 | .387 |
| Heat loss | 3.17 | 2.84 | 1.64 |

(B) *Treated sheet (Non-fogging)*

| | | | |
|---|---|---|---|
| Thickness thousandths of inch | 5 | 10 | 20 |
| Fog resistance seconds | 90 | 140 | 120 |
| Tensile strength, in pounds per sq. in.: | | | |
| A. Yield point | 9,850 | 8,850 | 7,300 |
| B. Break point | 9,850 | 8,850 | 7,560 |
| Elongation percent | 10.2 | 20.6 | 30 |
| Hardness | 10.6 | 10.6 | 9.13 |
| Moisture absorption | 8.83 | 7.73 | 5.96 |
| Water shrinkage percent | .074 | .125 | .209 |
| Heat loss | .329 | .258 | .211 |

In the tables the figures for "Fog resistance" were obtained by first preconditioning the sample of the sheet to be tested for one hour at 80° F. and 50% relative humidity. The sheet was then placed flat over the mouth of a one quart Mason jar containing one pint of water at 140° F., the jar being in turn placed over a newspaper. The time in seconds was noted when fogging first began to appear and the newsprint become illegible. By this test, treated or non-fogging plastic sheeting is fog resistant for not less than 50 seconds, usually from 90 to 150 seconds, whereas untreated plastic sheeting and glass will fog in two seconds or less. The figures for hardness are expressed as Brinell hardness in kilograms per square millimeter with a 5.5 millimeter ball, 10 kilogram load, 1 minute. The moisture absorption figures were obtained by conditioning the sheet material for 24 hours at zero percentage relative humidity, and noting the gain in weight after 48 hours at 90% relative humidity. To obtain the figures for water shrinkage, the sheet material was first conditioned for 24 hours at 50% relative humidity. The sheet material was then immersed in water for 3 hours and then conditioned again for 24 hours at 50% relative humidity. The figures given in the tables represent the percentage shrinkage in length. The figures for heat loss represent the percentage of loss in weight after heating the sheet material for 3 days at 70° C.

From the above tables it will be seen that the treated sheet material of plasticized cellulose acetate is remarkably stronger than the untreated plasticized cellulose acetate although the percentage of elongation is less. The latter, however, increases with the thickness of the sheet material whereas in the untreated plasticized cellulose acetate sheet material it decreases as the thickness increases. The treated material is moreover decidedly harder and more scratch-resisting than the untreated sheet material. This is probably due to the case hardening effect of the saponifying treatment and the absence on the surface of any substance such as a plasticizer. Indeed, cellulose acetate sheets treated in this manner appear to approximate the good mechanical properties of the well known product, Celluloid, such as resiliency and stiffness without brittleness, which are so much desired in the plastics industry. The light transmission of the treated sheet material is over 90% of white light which is practically unaffected by long exposure to sun or ultra violet light. For example, one hundred hours exposure in a standard "Fadeometer" testing machine caused only a slight bleaching of color with no apparent effect on light transmission.

The tables also show that the moisture absorption is very high in the treated plasticized cellulose acetate sheet material as compared with the untreated plasticized cellulose acetate sheet material, while the water shrinkage is less. A marked difference will also be noted in the weight loss at elevated temperatures, the untreated plasticized cellulose acetate sheet material losing appreciably after 3 days at 70° C. The case-hardening saponified layer in the treated sheet material acts as a seal and prevents further volatility of the plasticizer from the core of the sheet material. This is a very significant finding. Its benefits are appreciated in the case of printing cellulose acetate sheets and subsequently polishing same. The difficulties of ink transfer as brought out in U. S. Patent No. 1,931,485 are considerably diminished. Due to the porous surface the ink is more readily absorbed. In polishing the sheet any tendency of the plasticizer to exude is offset by this superficial absorption. Indeed, the treated sheets may be readily marked with ordinary ink and pen, and for this reason are very suitable for tracing cloth purposes. This ease of printing is utilized to advantage in marking or printing the non-fogging material, particularly when it is used for packaging purposes.

The saponified, porous surface also renders possible an easier lamination of the material to glass with cements such as gelatin, etc. The exudation of plasticizer on the surface of the sheet forming an oily skin interfering with proper adhesion to the glass or gelatin coating is appreciably minimized. This quality is also of material aid when it is desired to make anti-fogging, shatterproof glass lenses, windshields, etc., where one or both sides of the glass has a treated sheet of cellulose ester laminated thereto. The toughness and resiliency of the treated plastic sheeting, compared with an untreated sheet, make for added safety.

If desired, a roll of cellulose acetate film may have one or both sides saponified or deesterified sufficiently so that a thin coating or substratum of gelatin may be effectively applied. After the film is thus "subbed" say in continuous lengths, a thicker adhesive layer of glue, gelatin, gum arabic, casein, sodium silicate, egg albumin, dextrin, glyceryl or glycol boriborate resins, etc., may be subsequently applied so that the final, dried coated film or sheeting may be stuck to a variety of surfaces such as glass, wood, metal, paper, etc., by the mere application of water as in sticking of a postage stamp. In the past it has been quite difficult to apply gelatin coatings, even though extremely thin, directly to plasticized cellulose acetate materials, for example, in motion picture and X-ray film, where a heavier coating of light sensitive gelatin emulsions is usually applied over the thin gelatin substratum. This difficulty in securing proper anchorage of the gelatin to the surface of the film is generally attributed to the incompatibility of the oily, water-insoluble or hydrophobic plasticizer in or on the film with a hydrophilic colloid such as gelatin. The saponification of the cellulose ester and plasticizer results in a porous, water absorptive layer making possible more effective gelatin substrating. Ordinary glued paper labels may also be readily stuck to the surface of the non-fogging sheet by mere application of moisture. This feature is also quite desirable for packaging material.

While this invention thus finds exceedingly useful applications in many fields, the physical properties of the sheet material treated in accordance with this invention makes the same eminently suitable for use where non-fogging, transparent sheet material is desired. For example, when the sheet material of this invention is used as lenses in gas masks and goggles, or as inserts in combination with glass as previously described, or as containers or windows in food cartons, the said material will not fog or sweat due to the condensation moisture thereon, such as may be induced by exposure to low outside temperatures. This feature, as indicated above, is due to the porous and moisture absorptive character of the surface of the sheet material. No droplets of the moisture (fog) will appear on the surface of the sheet to mar the transparency thereof. Moreover, the treated material will not wrinkle or become sticky and distorted in use due to shrinkage or swelling, but will remain strong, flexible, non-tacky, non-moldy, clear and durable. Treated material will also exhibit less "static" than untreated material which is highly desirable in the case of packaging material. The treated surface is also more resistant to spotting by solvents such as acetone, alcohol, etc.

If desired, the treated sheets or films may be suitably composited or laminated to one or both sides of other plastic materials, such as those made of cellulose derivatives, synthetic resins such as Vinyloid, Lucite, styrol, condensation products of urea-formaldehyde, phenol-formaldehyde, glycerol-phthalic anhydride, etc.

While this invention has been described primarily with reference to the treatment of sheets, it is obvious that the cellulose ester material being treated may be in any other form such as a molded article of irregular shape and thickness, for example, threaded lens tops for flashlights are generally made by the so called injection molding of cellulose acetate. Such a finished molded article may be subjected to a saponification treatment to render the lens non-fogging.

It is to be understood, therefore, that the foregoing detailed description is given merely by way of illustration and that many variations may be made therein without departing from the spirit of my invention.

Having described my invention, what I desire to secure by Letters Patent is:

1. Gas masks, goggles and the like having eyepieces, adapted when in use to be exposed on the inner side to a moist warm atmosphere and on the outer side to a colder atmosphere without fogging or sweating, said eyepieces being made of sheet material containing an ester of cellulose, the inner surface of the eyepieces, which is exposed to said moist warm atmosphere, being saponified so that it is capable of absorbing moisture and the sheet material as a whole being resistant to the penetration of water and gases.

2. Gas masks, goggles and the like having eyepieces, adapted when in use to be exposed on the inner side to a moist warm atmosphere and on the outer side to a colder atmosphere without fogging or sweating, said eyepieces being made of sheet material containing cellulose acetate, the inner surface of the eyepieces, which is exposed to said moist warm atmosphere, being saponified so that it is capable of absorbing moisture and the sheet material as a whole being resistant to the penetration of water and gases.

3. Gas masks, goggles and the like having eyepieces, adapted when in use to be exposed on the inner side to a moist warm atmosphere and on the outer side to a colder atmosphere without fogging or sweating, said eyepieces being made of sheet material containing an ester of cellulose, said sheet material being saponified on its inner surface, which is exposed to said moist warm atmosphere, and substantially unsaponified throughout the greater portion of its thickness, whereby the sheet material as a whole is resistant to the penetration of water and gases.

4. Gas masks, goggles and the like having eyepieces, adapted when in use to be exposed on the inner side to a moist warm atmosphere and on the outer side to a colder atmosphere without fogging or sweating, said eyepieces being made of sheet material containing cellulose acetate, said sheet material being saponified on its inner surface, which is exposed to said moist warm atmosphere, and substantially unsaponified throughout the greater portion of its thickness, whereby the sheet material as a whole is resistant to the penetration of water and gases.

5. Gas masks, goggles and the like having eyepieces, adapted when in use to be exposed on the inner side to a moist warm atmosphere and on the outer side to a colder atmosphere without fogging or sweating, said eyepieces being made of laminated sheet material the laminae of which are sheet glass and a cellulose ester material, the lamina on the inner side of said eyepiece, which is exposed to said moist warm atmosphere, comprising cellulose ester material the exposed surface of which is saponified so that it is capable of absorbing moisture, and the laminated material as a whole being impervious to water and gases.

6. Gas masks, goggles and the like having eyepieces, adapted when in use to be exposed on the inner side to a moist warm atmosphere and on the outer side to a colder atmosphere without fogging or sweating, said eyepieces being made of laminated sheet material the laminae of which are sheet glass and cellulose acetate material, the lamina on the inner side of said eyepiece, which is exposed to said moist warm atmosphere, comprising cellulose acetate material the exposed surface of which is saponified so that it is capable of absorbing moisture, and the laminated material as a whole being impervious to water and gases.

BJORN ANDERSEN.